United States Patent

Mannel et al.

[11] Patent Number: 5,714,857
[45] Date of Patent: Feb. 3, 1998

[54] CURRENT REGULATION PROCESS FOR A THREE-PHASE, STATIC-CONVERTER-FED, PERMANENTLY EXCITED SYNCHRONOUS MACHINE

[75] Inventors: Ulrike Mannel, Untersiemau; Hans-Jürgen Tölle, Nürnberg, both of Germany

[73] Assignee: Siemens Aktiengesellschaft, Munich, Germany

[21] Appl. No.: 716,268

[22] PCT Filed: Mar. 24, 1994

[86] PCT No.: PCT/DE94/00335

§ 371 Date: Dec. 20, 1996

§ 102(e) Date: Dec. 20, 1996

[87] PCT Pub. No.: WO95/26072

PCT Pub. Date: Sep. 28, 1995

[51] Int. Cl.[6] .................................... H02P 5/40
[52] U.S. Cl. ................... 318/432; 318/721; 318/722; 318/724
[58] Field of Search ..................... 318/138, 254, 318/432, 433, 439, 700, 705, 720–724

[56] References Cited

U.S. PATENT DOCUMENTS

| 4,012,679 | 3/1977 | Matsuda et al. | 318/713 |
| 4,468,603 | 8/1984 | Vander Meer et al. | 318/729 X |
| 5,097,192 | 3/1992 | Iijima | 318/712 |

FOREIGN PATENT DOCUMENTS

| 0 350 716 | 1/1990 | European Pat. Off. |
| 31 31 344 | 7/1989 | Germany . |

OTHER PUBLICATIONS

Martin Schroder et al., "Hoctoutinger burstenloser Positionierantrieb mit extrem geringer Momentenwelligkeit", Institute fer Elektrische Maschinen und Antriebe der Universitat Stuttgart (1986).

Von Wolfgang Amrhein, "Die elektronische Reduktion von Drehmomentschwankungen an Permanentmagnetmotoren", 1155 Technische Rundschau 81, No. 10, Bern, Mar. 10 (1989).

*Primary Examiner*—Bentsu Ro
*Attorney, Agent, or Firm*—Kenyon & Kenyon

[57] ABSTRACT

A current regulation process and device for a three-phase, static-converter-fed, permanently excited synchronous machine with a trapezoidal magnet wheel voltage. A phase angle sensor is mounted on the motor shaft of the machine and is coupled to an evaluating device providing an actual speed of rotation value. Current measurement devices measure the currents to the machine. A current actual value spatial vector is generated from two phase current actual values, which spatial vector is estimated as a function of a calculated normalized magnet wheel voltage, whose rotor flux-oriented current components are supplied to current regulators, which generate a voltage spatial vector. A simple field-oriented current regulation is achieved for a three-phase, static-converter-fed, permanently excited synchronous machine with a smooth torque at low rotation speeds and low intermediary circuit or battery current ripple at high rotation speeds.

7 Claims, 6 Drawing Sheets

Machine Current

Stator Voltage

Magnetic Wheel Voltage

CURRENT REGULATION PROCESS FOR A THREE-PHASE, STATIC-CONVERTER-FED, PERMANENTLY EXCITED SYNCHRONOUS MACHINE

FIELD OF THE INVENTION

The present invention relates to a current regulation process for a three-phase, static-converter-fed, permanently excited synchronous machine.

BACKGROUND INFORMATION

European Patent Application No. 0 350 716 B1 describes a permanently excited synchronous machine with a trapezoidal magnet wheel voltage, driven by block-shaped phase currents. The regulating circuit of such a synchronous machine contains a current regulator with a pulse width modulator connected downstream. The actual value of the current at a given time is obtained using two measured phase currents and the actual value of the rotor orientation angle. Subsequently the regulating difference is calculated from a reference value and the measured actual value of the current. The control pulses for the power semiconductor of the power inverter, distributed to the corresponding bridge branches of the power inverter, are generated from the controller output voltage with the help of the pulse width modulator. If the synchronous machine is driven with exactly 120' long, rectangular currents and an ideal trapezoidal magnet wheel voltage, the torque ripple is equal to zero. Such operation of the machine is desirable, but cannot be achieved in practice, since it would require an infinitely high voltage due to the winding inductance needed to implement the block-shaped current with steep edges, and the power converter valves would require an infinitely high switching speed with no delays. In addition, the magnet wheel voltage of the permanently excited synchronous machine is not exactly trapezoidal.

Another disadvantage of this conventional type of regulation is that the current is affected in the phase not involved in switching. This results in strong pulsating torques and current harmonics on the DC input side of the power inverter, and thus in fluctuating input power. The European Patent No. 0 350 716 B1 describes a process for reducing such current disturbances.

The steeper the edge of the current block, the more the current approximates the ideal block current. Since a steeper edge requires more voltage reserves and increases the load on the supply lines and the winding of the permanently excited synchronous machine due to the steepness of the voltage, the steeper edge can be achieved to a certain degree. The current edge steepness has only a limited effect on the values obtained for power input and output, efficiency, and utilization. It strongly affects, however, the ripple of the intermediate circuit current, the battery current and the torque of a drive, especially of an electric vehicle drive. While a flat current edge is more advantageous for the intermediate circuit current and the battery current, it results in greater torque ripple.

Mr. Martin Schröder's 1986 dissertation entitled "High-speed brushless position drive with extremely low torque ripple" describes a current regulating process for a three-phase, static-converter-fed, permanently excited synchronous machine with a trapezoidal magnet wheel voltage. A device for implementing this current regulating process is illustrated in FIG. 1. Machine 2 is supplied from a four-quadrant pulse converter 4 with an intermediate voltage circuit equipped with field-effect power transistors. The reference values of the three phase currents are supplied to converter 4 in analog form as voltages. Phase current regulators 6, 8, and 10 are components of power inverter 4 as are current measurement points 12, 14, and 16. Since current regulation is based on a switching principle and the winding inductance is relatively small due to the large magnetic air gap, series reactors (not illustrated in detail) are required in the supply lines to the machine to smooth the current. These series reactors are also present in power inverter 4. An incremental phase angle sensor 18 is located on motor shaft 20 for measuring the actual values $\omega_{ist}$ and $\epsilon_{ist}$ of the rotation speed and the orientation angle, respectively; this incremental phase angle sensor supplies two output signals phase shifted by $\pi/2$. The actual digital value of the orientation angle $\epsilon_{ist}$ is obtained from these signals through an evaluation circuit 22 containing two counter circuits 24 and 26, and the rotation speed $\omega_{ist}$ is obtained from the signals of phase angle sensor 18, also called rotor orientation sensor.

Orientation and rotation speed regulators 28 and 30 are implemented in the form of programs in a microprocessor, so that the actual values $\epsilon_{ist}$ and $\omega_{ist}$, obtained in a digital form, can be processed directly. The regulator programs are called up within a fixed time frame and calculate the new reference values $\omega_{soll}$ and $\hat{i}_{soll}$ of the rotation speed and the current amplitude, respectively, using the actual values $\epsilon_{ist}$ and $\omega_{ist}$ of the position and the rotation speed, respectively, at a given moment. The reference value of the rotation speed, $\omega_{soll}$, is forwarded from the position regulating program to the rotation speed regulating program within the microprocessor. The reference value of the current amplitude, $\hat{i}_{soll}$, is output to current reference value generator 32 through a digital/analog converter not represented in detail. Current reference value generator 32 contains three storage devices 34, 36, and 38, where three phase current reference curves, referred to the amplitude $\hat{i}_{soll}$, are stored as a function of rotor angle $\epsilon$ in a tabular form. The three phase current reference values $i_{1soll}$, $i_{2soll}$, and $i_{3soll}$ are obtained by multiplying the table values found with the help of the actual value of the rotor angle, $\epsilon_{ist}$, by the phase current reference amplitude $\hat{i}_{soll}$, using three multipliers 40, 42, and 44, and are supplied to converter 4.

The functions $f_{i1}(\epsilon)$, $f_{i2}(\epsilon)$, and $f_{i3}(\epsilon)$ stored in storage devices 34, 36, and 38 are selected so that when the current amplitude reference value $\hat{i}_{soll}$ is constant, the torque is also constant. The calculation of these functions is discussed in Section 2.3 of the above-referenced dissertation.

In order to calculate functions $f_{i1}(\epsilon)$, $f_{i2}(\epsilon)$, and $f_{i3}(\epsilon)$, the equation of the internal torque of a three-phase synchronous machine is used first as indicated in Schröder's dissertation. In order to obtain a simple converter design, the sum of the currents must be zero at all times. Since only two equations are available for determining the three phase current reference values, an infinite number of solutions exist. A solution is obtained from among all the possible solutions using an additional condition, whose mathematical expression is described in the dissertation. Substituting currents $i_{2soll}$ and $i_{3soll}$ with functions of $i_{1soll}$, further equations of the dissertation are obtained for the additional conditions. Thus we have an isoperimetric variation problem with one unknown function $i_{1soll}(t)$ and two secondary conditions. As the solution of this variation problem, functions $f_{i1(\epsilon)}$, $f_{i2(\epsilon)}$, and $f_{i3(\epsilon)}$ are obtained, which are calculated and stored in a tabular form in advance, since they only contain values that are predetermined by the machine design. This reduces the real-time calculations required, so that $i_{1soll}$, $i_{2soll}$, and $i_{3soll}$ can be generated even in the case of high rotation speed current reference values.

With the above-described current regulating process, currents containing harmonics and thus generating almost no pulsating torques are injected into the machine. The locus diagram of this current, the supply voltage, and the magnet wheel voltage of synchronous machine 2 are shown in FIG. 2.

Contrary to a servo motor, the pulsating torques in an electric vehicle have a secondary role at high rotation speeds, since they are reduced by the inertia of the reduction gear, the flywheel, and the body. In the starting phase it is desirable that as smooth a torque as possible be obtained in order to avoid noisy start and rotational vibrations. On the other hand, the battery current must have low ripple so that the load on the electric vehicle battery is reduced. Downstream devices, such as, for example, loading equipment or battery managers, are also negatively affected by battery current ripple.

In the case of converters, supplied from the power mains, consisting of a static converter on the mains side, an intermediary voltage circuit, and a power inverter, a high intermediary current ripple places an excessive load on the intermediary circuit capacitor. In addition, it results in the line containing harmonics with frequencies equal to several times the machine frequency. This means that a converter supplied from the power mains is less grid-friendly.

SUMMARY OF THE INVENTION

An object of the present invention is to provide a current regulating process and a device for performing the current regulating process where most of the aforementioned disadvantages are eliminated, while the cost is kept within limits.

The permanently excited synchronous machine includes a trapezoidal magnet wheel voltage and includes a phase angle sensor mounted on the motor shaft. The machine also includes an evaluating device, providing an actual speed of rotation value and an actual rotor orientation angle value at its output, mounted downstream from the phase angle sensor.

By multiplying the absolute value of the current actual value spatial vector by the normalized magnet wheel voltage, a constant absolute value is obtained for the current, which constant absolute value is supplied to the current regulators. At low rotation speeds, this injects into the synchronous machine a current containing harmonics, which keeps the pulsating torque low as in the current regulating process shown in FIG. 1. At high rotation speeds, on the other hand, the regulators, depending on the fundamental periods, seldom intervene. i.e. the output voltages of the regulators barely change, which causes a sinusoidal voltage to be applied to the synchronous machine. This has a positive effect on the intermediate circuit current and the battery current, while the torque ripple increases slightly again. Since the magnet wheel voltage in the machine contains harmonics due to its trapezoidal shape, harmonic components are also generated in the current. They have the effect of reducing the oscillations in the input power at higher rotation speeds and increasing loads.

Thus, in accordance with the present invention, a current regulating process is obtained which, at low rotation speeds, injects a current containing harmonics as in the current regulation process described in the Schröder dissertation, wherein, however, the cost is reduced considerably, and which at higher rotation speeds applies a sinusoidal input voltage to the synchronous machine, so that the intermediary circuit current ripple or the battery current ripple is lower than that of the current regulation described in the Schröder dissertation, with the ripple decreasing with increasing loads. This means that, at low rotation speeds, the present invention achieves results that are similar to those of the current regulation process described in the dissertation, and provides better results in relation to the input power at high rotation speeds. In addition, the device for performing the process according to the present invention has a simpler design.

DETAILED DESCRIPTION

Figure 1:
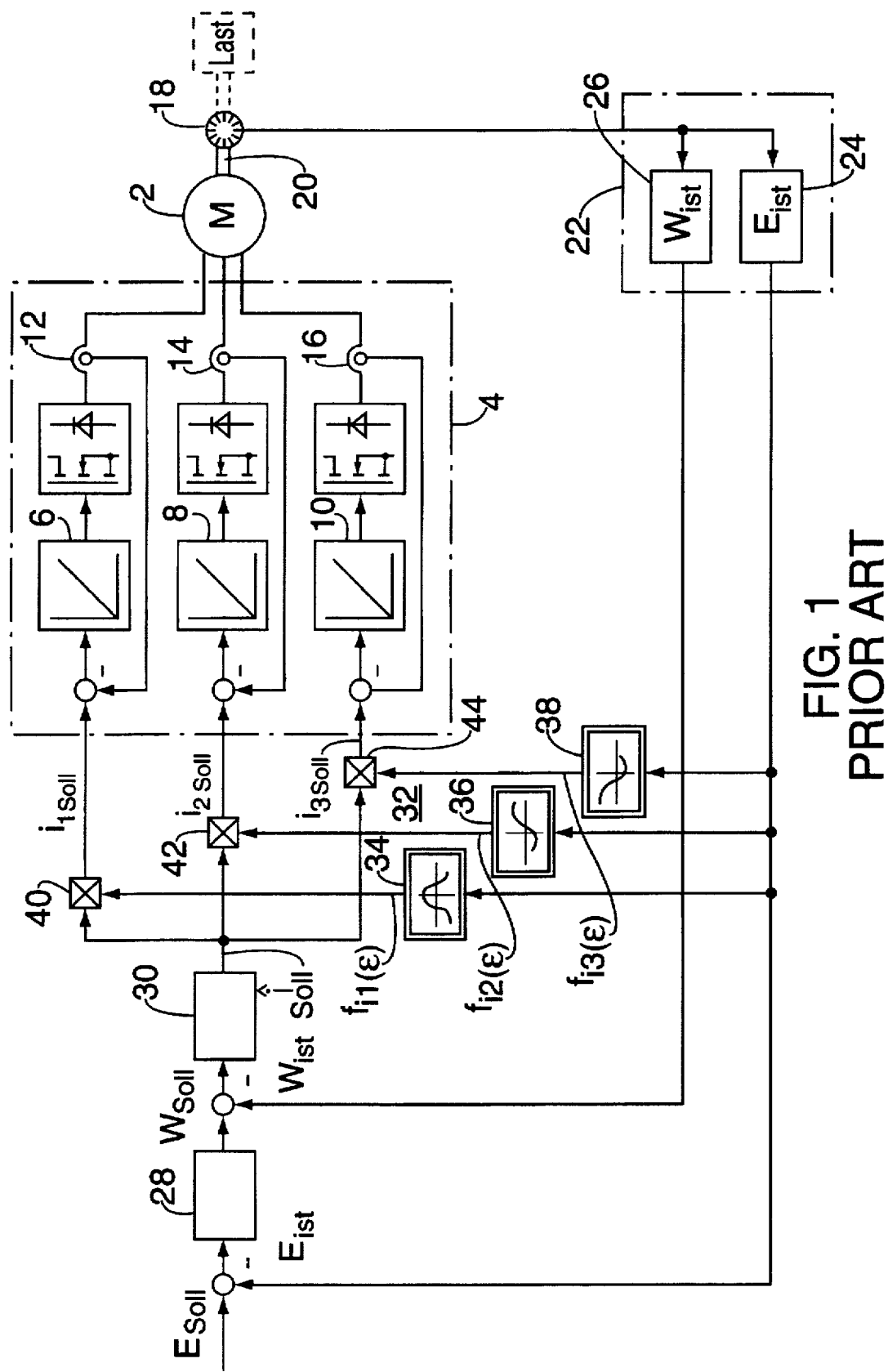
FIG. 1 shows the current regulating device described in the Schröder dissertation.
Figure 3:
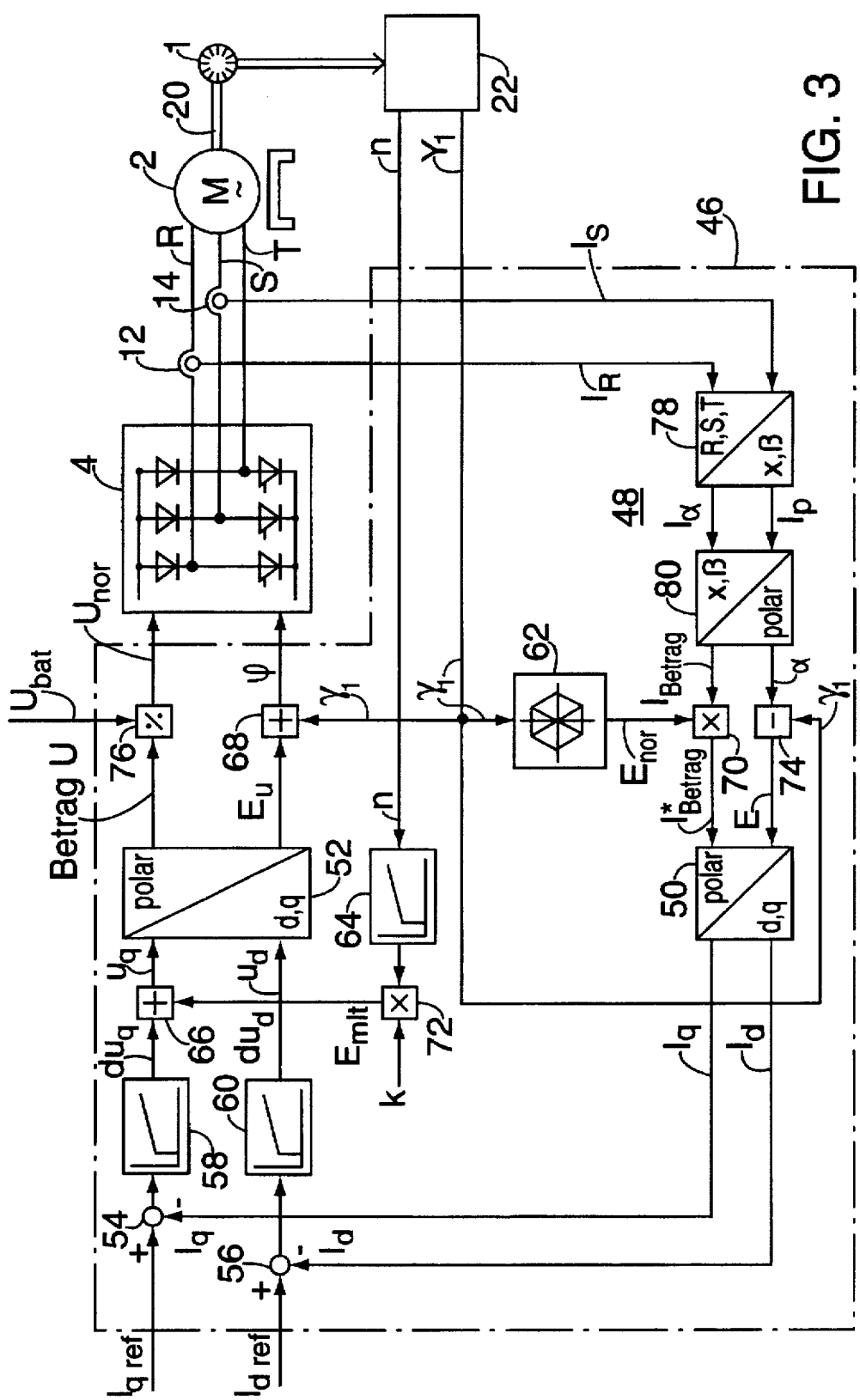
FIG. 3 shows a device for performing the current regulation process according to the present invention.

FIG. 3 shows a block diagram of a device 46 for performing a current regulating process in accordance with the present invention for a three-phase, static converter-fed, permanently excited synchronous machine 2 with an approximately trapezoidal magnet wheel voltage E. As in the device of FIG. 1, a rotor orientation sensor 18 is provided on motor shaft 20 for measuring the actual value of the rotation speed n and of rotor orientation angle $\gamma_1$, which rotor orientation sensor supplies two output signals phase-shifted by $\pi/2$. The actual values n and $\gamma_1$ are obtained from these signals, using evaluator circuit 22. A six-pulse pulse converter is provided as converter 4, which generates the control signals, using a spatial vector modulator, for the static converter valves of pulse converter 4 from a manipulated variable $\underline{U}$ (voltage vector), whose polar components $U_{nor}$ and angle $\phi$ are known. In German Patent No. 31 31 344, a control process and a control device for a pulse inverter are described (spatial vector modulation process). Another, microprocessor-based implementation for a spatial vector modulator is described in the German journal Antriebstechnik, Vol. 27, 1988, No. 4, pp. 38, 40, and 42. This modulator is not illustrated in detail in the schematic of FIG. 3. In addition, only two Current measurement points 12 and 14 are provided, where phase current actual values $I_R$ and $I_S$ are measured.

Device 46 comprises a transforming means 48 on the input side, two coordinate converters 50 and 52, two comparators 54 and 56, two current regulators 58 and 60, a device 62 for generating a value of a normalized magnet wheel voltage $E_{nor}$, and a characteristic curve sensor 64.

In addition, this advantageous device has two adders 66 and 68, two multiplicators 70 and 72, a subtractor 74, and a divider 76. The transforming means 48 at the input comprises a device 78 for calculating current components $I_\alpha$ and $I_\beta$ of the current actual value spatial vector in a coordinate system referred to the stator and a coordinate converter 80, which converts stator-oriented Cartesian current components $I_\alpha$ and $I_\beta$ to stator-oriented polar current components $I_{Betrag}$ and $\alpha$. Device 78 and coordinate converters 50, 52, and 80 can be implemented with known field-oriented regulation devices.

Device 62 can be a computing device or a storage device, where tables for converting the rotor orientation angle actual values $\gamma_1$ into normalized magnet wheel voltage values $E_{nor}$ are stored. If device 62 is implemented using a computing device, it computes the value of the normalized magnet wheel voltage $E_{nor}$ as a function of the orientation angle actual value $\gamma_1$ on an ongoing basis using the following formulas:

$$\phi = Mod\left(\frac{\gamma}{60°}\right) \quad (1)$$

$$|E_{nor}| = \sqrt{E_\alpha^2 + E_\beta^2} = \frac{\frac{1}{2} \cdot \sqrt{3}}{\sin(120° - \phi)} \quad (2)$$

Figure 5:
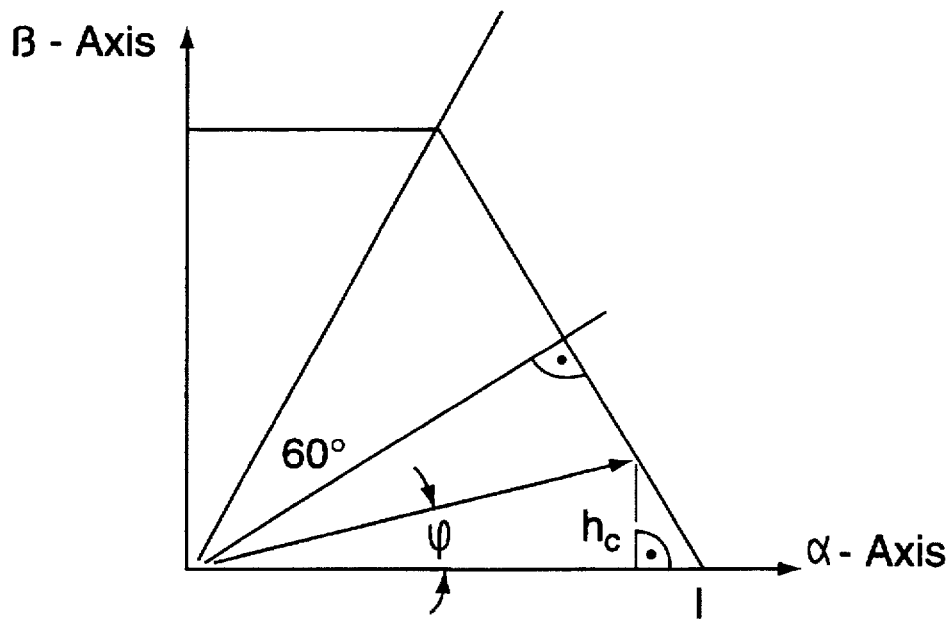
FIG. 5 shows a section of the locus diagram of the trapezoidal magnet wheel voltage.

FIG. 5 is used to derive formula (2). The relationship among the angles of a generic triangle can be used for calculating the length of the magnet wheel vector as a function of the rotation angle. The length of the vector, also referred to as the EMK vector, is referred to a normalized unit length and converted into the $\alpha,\beta$ coordinate system referred to the stator. If the $\alpha$ and $\beta$ components are known for a 60° range, recalculation for the remaining angle range can be performed by reconversion of the angle to a 60° sector and with the help of the polar transformation. FIG. 5 shows the relationships. For height $h_c$ in an arbitrary triangle, the following relationship applies:

$$E_\beta = h_c = \frac{1}{2} \cdot \sqrt{3} \cdot \frac{\sin\phi}{\sin(120° - \phi)} \quad (3)$$

with the relationship for a right-angle triangle $$\frac{E_\beta}{E_\alpha} = \tan\phi = \frac{\sin\phi}{\cos\phi} \quad (4)$$

$$E_\alpha = \frac{\cos\phi}{\sin\phi} \cdot E_\beta = \frac{1}{2} \cdot \sqrt{3} \cdot \frac{\cos\phi}{\sin(120° - \phi)}$$

For the normalized absolute value, we have:

$$|E_{nor}| = \sqrt{E_\alpha^2 + E_\beta^2} = \frac{\frac{1}{2} \cdot \sqrt{3}}{\sin(120° - \phi)} \quad (2)$$

In general, for a rotation angle $\gamma$ and with equation (2), the following applies:

$$\phi = Mod\left(\frac{\gamma}{60°}\right) \quad (1)$$

$$E_\alpha = |E_{nor}| \cdot \cos(\gamma) \quad (5)$$

$$E_\beta = |E_{nor}| \cdot \sin(\gamma).$$

These calculations can also be performed off line, and the results can be stored in a conversion table.

The stator-oriented polar components $I_{Betrag}$ of the current actual value spatial vector is evaluated with the help of the normalized magnet wheel voltage $E_{nor}$. For this purpose, the stator-oriented polar component $I_{Betrag}$ is calculated with a value of the normalized magnet wheel voltage $E_{nor}$ using multiplicator 70, which may vary between 0 and 1. Thus a stator-oriented polar component $I^*_{Betrag}$ is obtained, which is constant when the following relationship applies:

$$P_i = |\underline{U}_P| \cdot |\underline{I}| = \text{constant}, E_{nor} = \frac{|\underline{U}_P|}{|\underline{U}_P|_{max}} \ ; E_{nor} \cdot |\underline{I}| = I^*_{Betrag}$$

If the internal power $P_1$ of the synchronous machine is independent, this must also be true for the current vector estimated with $E_{nor}$. This estimated current vector having the components $I^*_{Betrag}$ and $\alpha$ is subsequently transformed into a rotor-oriented coordinate system (d,q system). For this purpose, the current rotor flux angle $\gamma_1$ is subtracted from angle $\alpha$ by subtractor 74. The polar coordinates $I^*_{Betrag}$ and $\epsilon$ of the estimated current actual value spatial vector are obtained in the rotor flux-oriented coordinate system as a result. These polar coordinates $I^*_{Betrag}$ and $\epsilon$ are converted to rotor flux-oriented Cartesian components $I_d$ and $I_q$ using the coordinate converter. These rotor flux-oriented components $I_d$ and $I_q$ of the estimated actual current value spatial vector are supplied to the negative inputs of comparators 56 and 54, respectively, at whose positive inputs reference values $I_{dref}$ and $I_{qref}$ appear. Regulator output voltages $dU_d$ and $dU_q$, previously converted into polar components U and $\epsilon_U$ by coordinate converter 52, are obtained from the calculated control deviations using current regulators 60 and 58. In order to alleviate the load on current regulator 58, the average magnet wheel voltage $E_{mit}$ is added to the regulator output voltage $dU_q$ by adder 66, so that current regulator 58 has to adjust only the deviations from the average magnet wheel voltage $E_{mit}$. Average magnet wheel voltage $E_{mit}$ depends on rotation speed n. Therefore the corresponding average magnet wheel voltage $E_{mit}$ is obtained, with the help of characteristic curve sensor 64, from the actual value n of the rotation speed and a constant k. Polar components $U_{Betrag}$ and $\epsilon_u$ of the rotor flux-oriented voltage spatial vector (manipulated variable) are subsequently converted into stator-oriented polar components $U_{Betrag}$ and $\phi$ by adding the current rotor orientation angle $\gamma_1$ to $\epsilon_u$ with the help of adder 68.

Stator-oriented polar component $U_{Betrag}$ is also normalized with battery voltage $U_{Bat}$, when used in an electric vehicle, or with the intermediary circuit voltage of the converter. The polar components $U_{nor}$ and $\phi$ are supplied to the spatial vector modulator (not illustrated) of pulse inverter 4.

Figure 2:
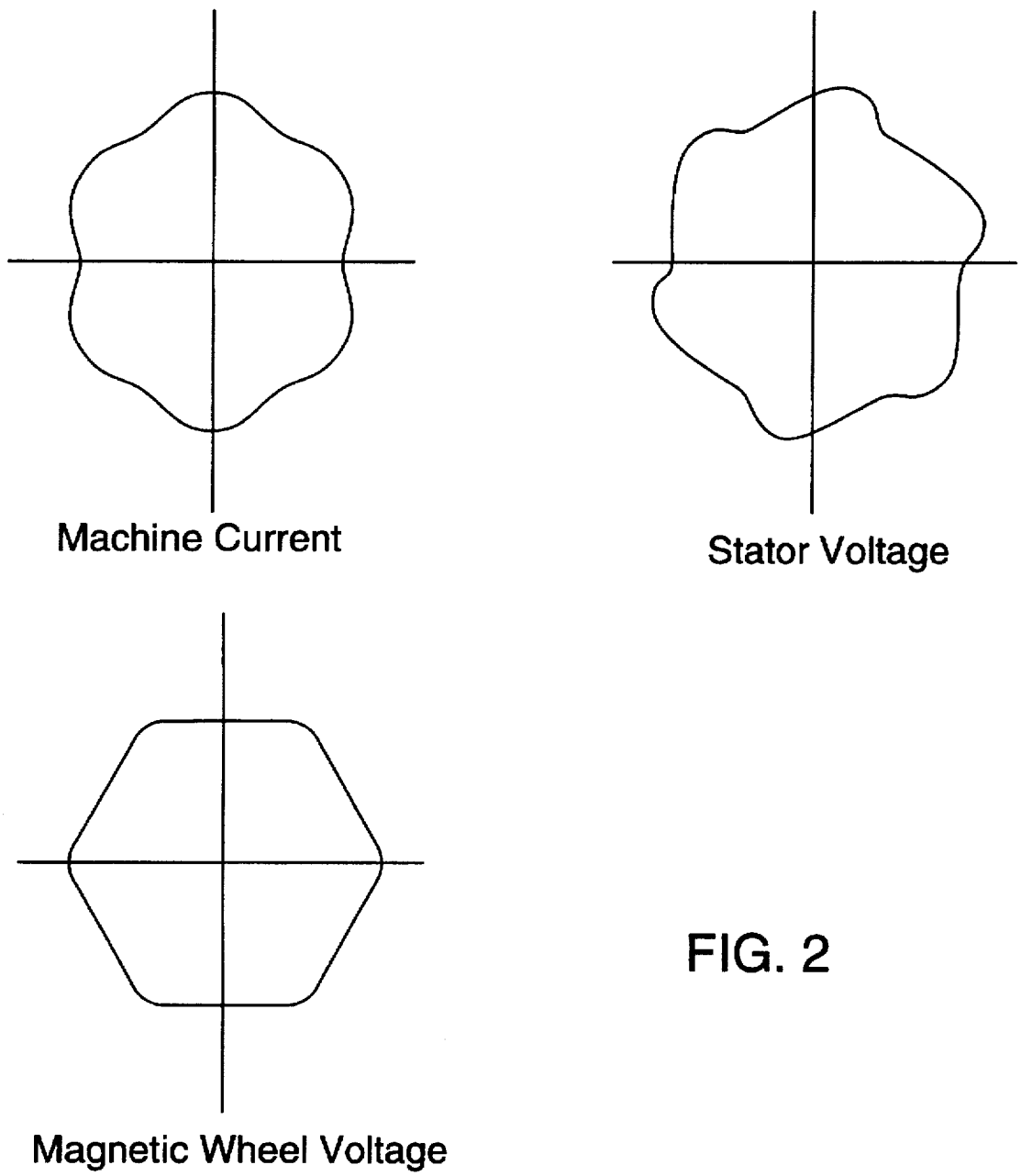
FIG. 2 shows the locus diagrams of the injected current, the input voltage, and the magnet wheel voltage of the permanently excited synchronous machine, regulated with the current regulation device of FIG. 1.
Figure 6:
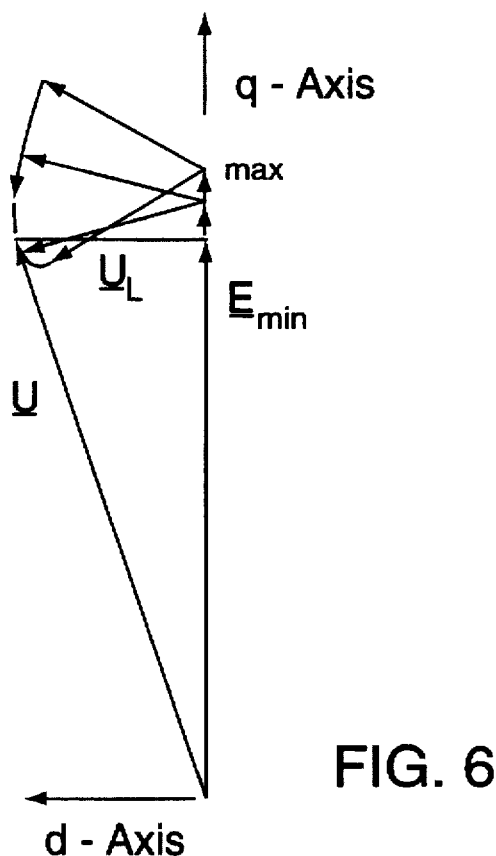
FIG. 6 shows the spatial vector of the machine voltage at low rotation speeds.

Differential voltage vector $\underline{U}_L$ in the vector diagram of FIG. 6 is responsible for current injection into synchronous machine 3. The vectorial addition of magnet wheel voltage vector $\underline{E}$ and differential voltage vector $\underline{U}_L$ provides the spatial vector of the machine voltage $\underline{U}$. If this voltage $\underline{U}$ is applied to the individual phases of the permanently excited synchronous machine 2, currents requiring an extremely low torque ripple are injected. The same locus diagrams are obtained for the current (FIG. 2) as with the current regulating process described in the dissertation. Only at low rotation speeds are regulators 58 and 60 capable of generating these differential voltages, so that a current with harmonics, which will keep the torque ripple low, can be injected.

Figure 4:
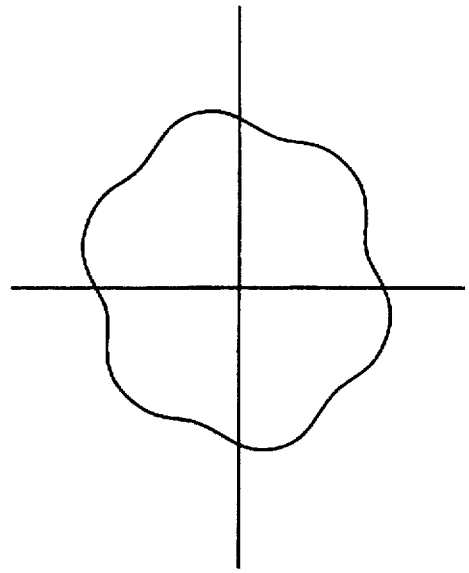
FIG. 4 shows the locus diagrams of the current, the input voltage, and the magnet wheel voltage of a synchronous machine at high rotation speeds, regulated with the process according to the present invention.
Figure 4:
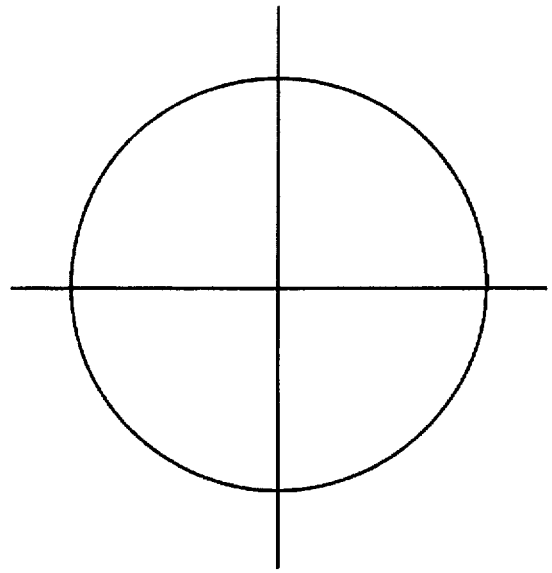
Figure 4:
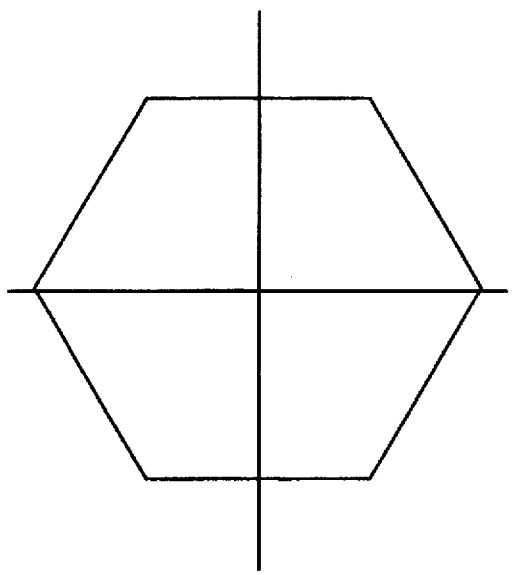
Figure 7:
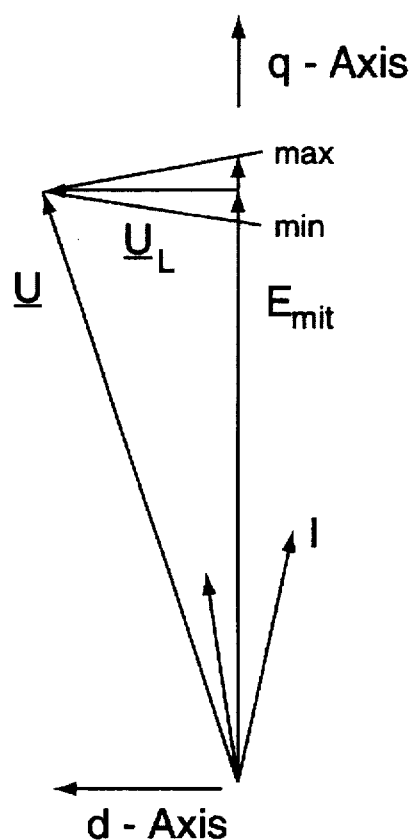
FIG. 7 shows the spatial vector of the machine voltage at high rotation speeds.

At higher rotation speeds, output voltages $dU_q$ and $dU_d$ of current regulators 58 and 60 barely change, since current regulators 58 and 60 have a high inertia at high rotation speeds. This means that a sinusoidal input voltage is applied to the machine, whose locus diagram (circle) is shown in FIG. 4 in the form of a diagram. Since magnet wheel voltage E of machine 2 contains harmonics due to its trapezoidal shape (FIG. 4), harmonics are also generated in the current. As a result, the Cartesian d and q current components are no longer constant. The corresponding locus diagram of current $\underline{I}$ is illustrated in FIG. 4 and the vector diagram for the case of sinusoidal supply is illustrated in FIG. 7.

Figure 8:
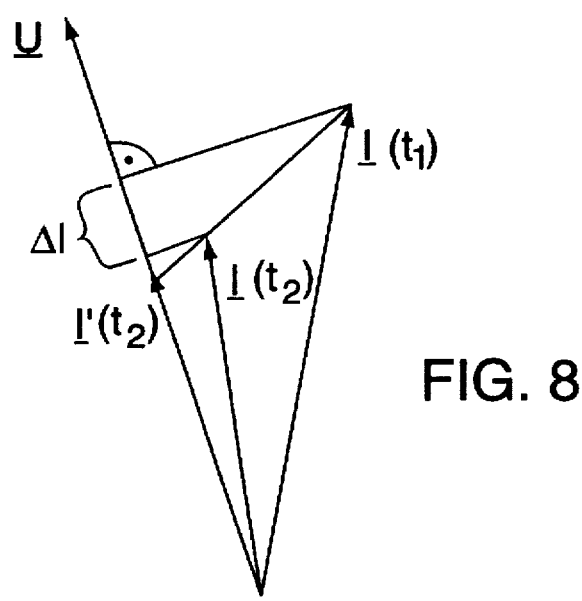
FIG. 8 shows a vector diagram for calculating the battery power.

The battery power is obtained by multiplying voltage $\underline{U}$ by the current $\underline{I}'(t_v)$ projected onto voltage vector $\underline{U}$ (FIG. 8). A non-constant projected current $\underline{I}'$ is obtained. The current component $\Delta I$ provides a measure of the battery power ripple. The battery power is constant over time only if the individual current vector peaks are located exactly on a straight line ($\Delta I$=0), which is perpendicular to phase voltage $\underline{U}$. At higher rotation speeds and increasing loads, the current component $\Delta I$ becomes smaller and thus the ripple of the input power is reduced.

In another embodiment of the present invention, a microcontroller, for example, a 16-bit computer of the type SAB C167, is used as device 46.

With the current regulation process according to the present invention, reduction in the pulsating torque is achieved at low rotation speeds, so that smooth torque is obtained upon starting. At higher rotation speeds, the battery current ripple is reduced, which reduces the load on the battery of an electric vehicle. This field-oriented regulation has the additional advantage of facilitating field control of the synchronous machine 2 by providing a reference $I_{dref}$=0.

The current regulation process according to the present invention is not limited to the application in electric vehicles, but can also be used in line-fed converters including a static converter on the line side, an intermediary voltage circuit, and a current inverter, which increases the power grid-friendliness of the converter.

What is claimed is:

1. A method of regulating phase currents for a three-phase, static-converter-fed, permanently excited synchronous machine having a trapezoidal magnet wheel voltage, wherein a phase angle sensor is arranged on a motorshaft of the machine, with an evaluation device coupled downstream from the phase angle sensor, the evaluation device generating a rotation speed actual value and a rotor orientation angle actual value, the method comprising the steps of:

measuring two of the phase currents;

determining polar components, including absolute value and angle, of a current actual value spatial vector representing the measured phase currents;

calculating a normalized magnet wheel voltage as a function of the rotor orientation angle actual value;

multiplying the absolute value of the current actual value spatial vector by the calculated normalized magnet wheel voltage;

transforming the polar components of the current actual value spatial vector into rotor flux-oriented current components;

generating rotor flux-oriented manipulated variable components as a function of the rotor flux-oriented current components and of current rotor flux-oriented current reference value components; and transforming the rotor flux-oriented manipulated variable components into polar components of a manipulated variable spatial vector.

2. The method according to claim 1, wherein the rotor flux-oriented manipulated variable components include a torque-forming rotor flux-oriented manipulated variable component, the torque-forming rotor flux-oriented manipulated variable component being modified as a function of an average magnet wheel voltage value.

3. The method according to claim 2, wherein the average magnet wheel voltage value is obtained as a function of the rotation speed actual value and a stored magnet wheel voltage characteristic curve.

4. The method according to claim 1, further comprising the steps of:

subtracting the rotor orientation angle actual value from the angle of the current actual value spatial vector; and adding the rotor orientation angle actual value to an angle of the manipulated variable spatial vector.

5. A device for regulating phase currents of a three-phase, static-converter-fed, permanently excited synchronous machine having a trapezoidal magnet wheel voltage, the device comprising:

a phase angle sensor arranged on a motor shaft of the machine;

an evaluation device coupled to the phase angle sensor for generating a rotor orientation angle actual value;

first and second current measuring devices for measuring two of the phase currents;

a transformation device coupled to the first and second current measuring devices and having an absolute value output and an angle output;

a multiplier with a first input coupled to the absolute value output of the transformation device;

a subtractor with a first input coupled to the angle output of the transformation device and a second input coupled to the evaluation device for receiving the rotor orientation angle actual value;

a first coordinate converter coupled to an output of the multiplier and to an output of the subtractor, the first coordinate converter having an absolute value output and an angle output;

a comparator coupled to each of the absolute value and angle outputs of the first coordinate converter, each of the comparators including an input for receiving a reference value and an output;

a current regulator coupled to the output of each comparator;

a second coordinate converter coupled to outputs of the current regulators and having an absolute value output and an angle output;

a divider having a first input coupled to the absolute value output of the second coordinate converter and a second input for receiving an intermediate circuit voltage value;

an adder with a first input coupled to the angle output of the second coordinate converter and a second input coupled to the evaluation device for receiving the rotor orientation angle actual value; and a normalized magnet wheel voltage generating device coupled to the evaluation device for receiving the rotor orientation angle actual value and having an output coupled to a second input of the multiplier.

6. The current regulating device of claim 5, wherein the evaluation device generates a rotation speed actual value and the current regulating device further comprises:

a characteristic curve sensor coupled to the evaluation device for receiving the rotation speed actual value;

a second multiplier with an input coupled to an output of the characteristic curve sensor; and a second adder with a first input coupled to an output of the second multiplier, wherein the output of one of the current regulators is coupled to a second input of the second adder and wherein the second converter is coupled to an output of the second adder.

7. The current regulating device according to claim 5, wherein the normalized magnet wheel voltage generating device includes a microcontroller.

* * * * *